United States Patent [19]

Akashi

[11] Patent Number: 5,013,511
[45] Date of Patent: May 7, 1991

[54] METHOD OF MAKING A SLIDER FOR USE IN A SLIDE FASTENER

[75] Inventor: Shunji Akashi, Toyama, Japan

[73] Assignee: Yoshida Kogyo K. K., Tokyo, Japan

[21] Appl. No.: 445,027

[22] Filed: Dec. 4, 1989

[51] Int. Cl.$^5$ .............................................. B29C 45/16
[52] U.S. Cl. ..................................... 264/242; 264/264;
  249/142; 425/130; 425/814; 425/DIG. 34
[58] Field of Search ....................... 264/242, 255, 264;
  249/142; 425/130, 814, DIG. 34

[56] References Cited

U.S. PATENT DOCUMENTS

| | | | |
|---|---|---|---|
| 2,495,539 | 1/1950 | Natzler et al. | 425/814 |
| 2,519,171 | 8/1950 | Bolten | 249/142 |
| 4,790,973 | 12/1988 | Minami et al. | 264/242 |

Primary Examiner—Jan H. Silbaugh
Assistant Examiner—Angela Ortiz
Attorney, Agent, or Firm—Hill, Van Santen, Steadman & Simpson, A Professional Corp.

[57] ABSTRACT

A method of making a slider for use in a slide fastener, which slider is provided with bearings for a pull tab on an upper surface of a slider body on its opposite side to pivotably hold a pintle of the pull tab. By making use of only one slide core, a slider body mold cavity in a mold is blocked from a pull tab mold cavity and at the same time, hollow space portions in the bearings for the pull tab are formed by means of the slide core. After molding the slider body, by retreating this slide core, the hollow space portions in the already molded pull tab bearings are used as a mold portion for a pintle of the pull tab. By injecting an amount of molten synthetic resin having a larger thermal contraction coefficient than the synthetic resin used previously for molding the slider body, into the pull tab mold cavity, the pintle of the pull tab and the pull tab are integrally molded.

1 Claim, 2 Drawing Sheets

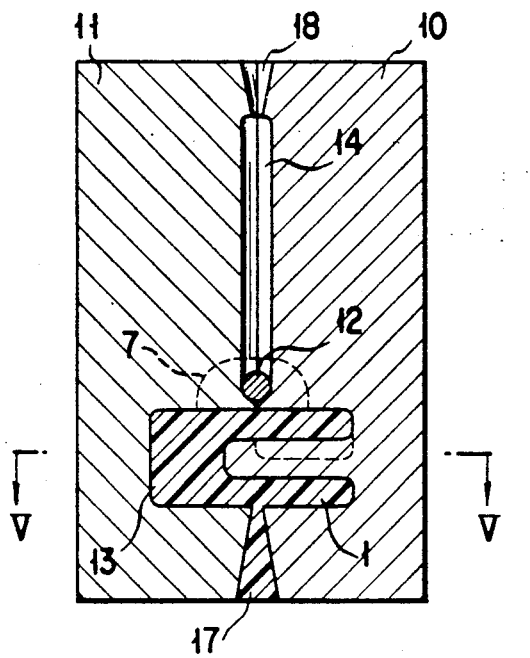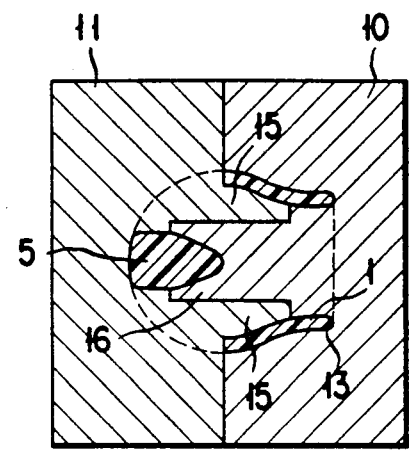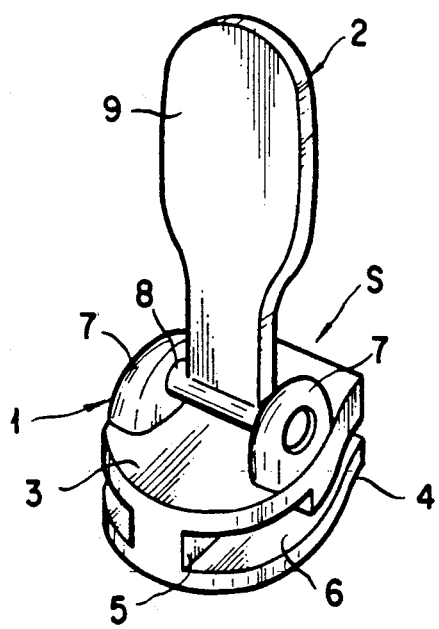

METHOD OF MAKING A SLIDER FOR USE IN A SLIDE FASTENER

BACKGROUND OF THE INVENTION

1. Field of the Invention

The present invention relates in general to a method of making a slider for use in a slide fastener, and more particularly to a method of making a slider for use in a slide fastener, which slider is provided with bearings for a pull tab on an upper surface of a slider body on its opposite sides to pivotably hold a pintle of the pull tab between the respective bearings for the pull tab, and which method can mold the slider body and the pull tab in an assembled state by one effort.

2. Description of the Prior Art

The technique of molding a slider body and a pull tab in an assembled state by one effort has been disclosed in the specification of Japanese Pat. application No. 63-13324 (which corresponds to U.S. Pat. No. 4,790,973 issued on Dec. 13, 1988) filed previously (on Jan. 23, 1988) by the Assignee of this U.S. patent application. According to the technique disclosed in the specification of the above-referred prior patent application, a slider body mold cavity and a pull tab mold cavity are provided in continuation within a mold, a pair of slide cores are inserted into the continuing portion between the respective mold cavities to sever the respective mold cavities, then at first an amount of molten material is injected into the slider body mold cavity to mold a slider body and also integrally mold an arch-shaped post elongated in the front and rear directions on the upper surface of the slider body, and at that time a hollow space under the arch-shaped post is formed by both the slide cores. Subsequently, one of the slide cores is retreated to form a mold portion of a pintle of a pull tab which passes through the hollow space under the already molded arch-shaped post in continuation with the pull tab mold cavity, then an amount of molten material is injected into the pull tab mold cavity to mold the pull tab having the aforementioned pintle, and thereby a slider is manufactured.

Here, it is to be noted that the reason why a pair of slide cores must be use in the above-mentioned method in the prior art is because it is necessary to form the pintle of the pull tab thinner than the cross-section area of the hollow space under the arch-shaped post so that the pintle of the pull tab can pass through the hollow space and moreover can be freely moved back and forth and rotated within the hollow space. Accordingly, at the time point when the slider body is molded, a hollow space having a sufficiently large cross-section area under the arch-shaped post is molded by making use of the both slide cores, and subsequently, by retreating one of the slide cores, a relatively thin pintle of a pull tab having a cross-section area corresponding to that of the retreated slide core is molded. Therefore, the use of a pair of slide cores is essentially necessary. However, due to the use of a pair of slide cores, a high degree of precision is required for the tightness of fitting between the respective slide cores and between the slide cores and the mold members, moreover as the number of the slide portions is increased, the structure of the mold members becomes complicated, and to say nothing of the production of mold members, there was a problem that a production efficiency of molded products was degraded.

SUMMARY OF THE INVENTION

It is therefore one object of the present invention to provide a method of making a slider for use in a slide fastener, in which highly precise products can be manufactured efficiently by making use of a simplified mold.

According to one feature of the present invention, there is provided a method for making a slider for use in a slide fastener, which slider consists of a slider body having a pair of bearings for a pull tab on the opposite sides of its upper surface and a pull tab having a pintle provided at its base end pivotably supported between the respective bearings for the pull tab; which method is comprised of a first preparatory step, in which a mold provided with a slider body mold cavity and a pull tab mold cavity in continuation with pull tab bearing mold portions of the slider body mold cavity is employed, a slide core is inserted into the pull tab bearing mold portions of the aforementioned mold to block the slider body mold cavity from the pull tab mold cavity by means of the slide core and also to form hollow space portions in the pull tab bearings; a first injection-molding step, in which an amount of molten synthetic resin is injected into the blocked sliuer body mold cavity and is left for a solidifying period; a second preparatory step, in which the slide core is retreated to make the pull tab mold cavity communicate with the already injection-molded slider body mold cavity via a pull tab pintle mold portion between the respective pull tab bearings; and a second injection-molding step, in which an amount of molten synthetic resin having a larger thermal contraction coefficient than the synthetic resin injected into the slider body mold cavity, is injected into the pull tab mold cavity, and is left for a solidifying period.

In other words, the essence of the counter-measure for resolving the afore-mentioned problem in the prior art, according to the present invention, resides in that only one slide core is used, a slider body mold cavity is blocked from a pull tab mold cavity and at the same time hollow space portions in the bearings for the pull tab are formed by means of the slide core, moreover, after molding of the slider body, by retreating this slide core the hollow space portions in the already molded pull tab bearings are used as a mold portion for a pintle of the pull tab, and then by injecting an amount of molten synthetic resin having a larger thermal contraction coefficient than the synthetic resin used previously for molding the slider body, into the pull tab mold cavity, the pintle of the pull tab and the pull tab are integrally molded.

According to the present invention, owing to the above-described novel feature of the invention, a structure of a mold can be simplified, hence the mold can be manufactured at a high precision, and accordingly, the products molded by this precise mold can reduce protrusion of burrs to minimum and thus can be produced at a high precision. Moreover, as a result of simplification of the production process, an advantage that a production efficiency is improved, can be obtained.

The above-mentioned and other objects, features and advantages of the present invention will become more apparent by reference to the following description of one preferred embodiment of the invention taken in conjunction with the accompanying drawings.

BRIEF DESCRIPTION OF THE DRAWINGS

In the accompanying drawings illustrating one preferred embodiment of the present invention:

FIG. 4 is another longitudinal cross-section view of the same mold taken along line IV—IV in FIG. 1 as viewed in the direction of arrows;

FIG. 5 is a transverse cross-section view of the same mold taken along line V—V in FIG. 4 as viewed in the direction of arrows; and FIG. 6 is a perspective view showing a slider molded through the method according to the present invention.

DESCRIPTION OF THE PREFERRED EMBODIMENT

Figure 1:
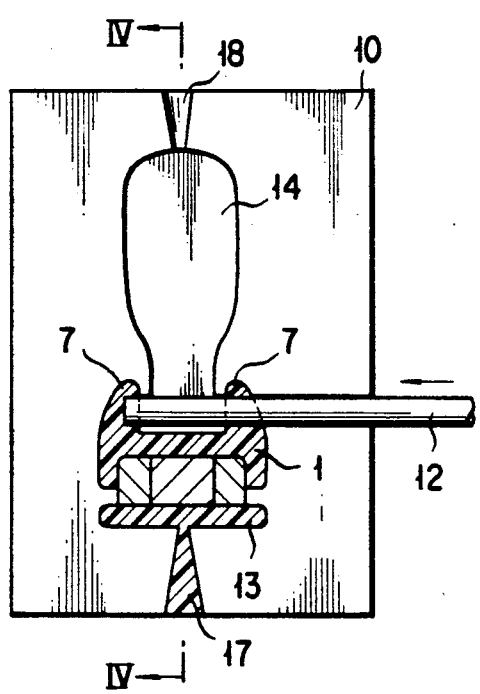
FIG. 1 is a longitudinal cross-section view of a mold showing the state upon finishment of a first injection-molding step in the method of making a slider for use in a slide fastener according to the present invention.

In one preferred embodiment of the method of making a slider for use in a slide fastener according to the present invention, a slider S as shown in FIG. 6 is produced through the steps shown in FIGS. 1 to 5. This slider S is composed of a slider body 1 and a pull tab 2, the slider body 1 includes an upper wing 3 and a lower wing 4 held in parallel to each other and integrally connected to each other at their front end portions via a diamond or neck 5, between the upper wing 3 and the lower wing 4 is formed a Y-shaped channel 6 for guiding elements of a slide fastener, and further on the upper surface of the upper wing 3 are provided bearings 7, 7 for the pull tab 2 as projected from the upper surface and spaced from each other on the opposite sides. The pull tab 2 is formed of a pintle 8 adapted to be pivotably fitted in and between the pull tab bearings 7, 7 and a pull tab main body 9 integrally joined with the pintle 8, and the slider body 1 and the pull tab 2 are both formed of synthetic resin.

The mold for making the above-described slider S is formed of a stationary mold member 10, a movable mold member 11 and a slide core 12 as shown in FIGS. 4 and 5. Extending in both the stationary mold member 10 and the movable mold member 11 held in tight contact with each other, as best seen in FIG. 4, a slider body mold cavity 13 is provided horizontally, a pull tab mold cavity 14 is provided above the slider body mold cavity 13 as erected vertically in continuation therewith, furthermore as shown in FIG. 5 cores 15 and 16 are projected from the respective mold members 10 and 11 into the slider body mold cavity 13 to mold the diamond 5 and the Y-shaped channel 6.

The slide core 12 consists of a circular rod, which penetrates through the portions of the slider body mold cavity 13 for molding the pull tab bearings 7, 7 as extending over the both mold members 10 and 11, to form the hollow space portions in the pull tab bearings 7, 7 and also t block the slider body mold cavity 13 from the pull tab mold cavity 14. It is to be noted that as shown in FIG. 1, the penetrating slide core 12 completely passes through the portion for molding one pull tab bearing 7, but it is inserted into the portion for molding the other pull tab bearing 7 by about one half depth.

Figure 3:
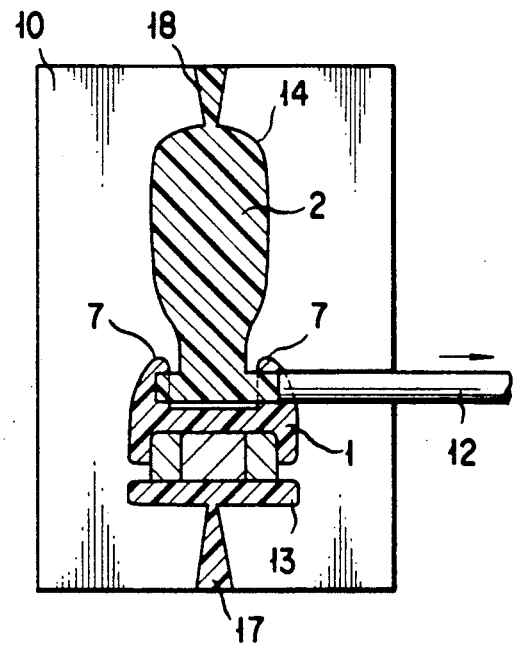
FIG. 3 is a longitudinal cross-section view of the same mold but showing the state upon finishment of a second injection-molding step in the method according to the present invention.
Figure 2:
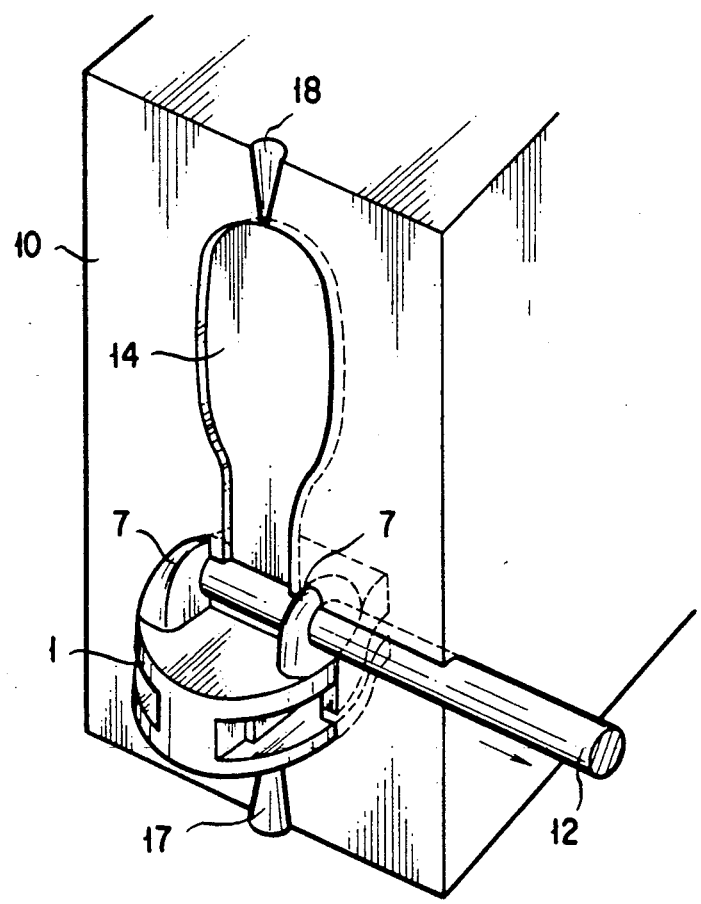
FIG. 2 is a perspective view showing the same state of the mold with one of half mold members removed.

In manufacture of a slider by making use of the above-described mold, at first a first preparatory step of the process, in which the slide core 12 is initially inserted into the mold in the above-described manner to block the slider body mold cavity 13 from the pull tab mold cavity 14, is carried out. Subsequently, a first injection-molding step in which an amount of molten synthetic resin is injected through a first gate 17 at the bottom of the mold as seen in FIG. 1, is carried out. By this injection through the first gate 17, the slider body 1 including the pull tab bearings 7, 7 is molded. At this time, owing to the existence of the slide core 12, hollow space portions are formed in the respective pull tab bearings 7. Then, after the mold has been left for a period necessary for the injected molten material to solidify, a second preparatory step in which the slide core is retreated is carried out. In this case, as shown in FIG. 3, the tip end surface of the slide core 12 is retreated up to the middle point of the depth of the portion for molding the pull tab bearing 7 through which the slide core 12 completely penetrated so far. After the second preparatory step has been executed in the above-described manner, a second injection-molding step in which molten syntehtic resin is injected through a second gate 18 at the top of the mold as viewed in FIG. 1, is carried out. By this step of the process, the pull tab main body 9 and the pintle 8 fitted in the respective pull tab bearings 7, 7 are integrally molded.

However, in the event that the same molten synthetic resin as that used in the first injection-molding step should be injected in the second injection molding step, the molded pintle 8 would completely fill the hollow space portions left in the pull tab bearings 7, 7 after the slide core 12 was retreated, and hence the pintle 8 could not rotate smoothly in the pull tab bearings 7, 7.

Therefore, according to the present invention, in the second injection-molding step, molten synthetic resin having a larger thermal contraction coefficient than the molten synthetic resin injected in the first injection-molding step is injected, so that reduction of the diameter of the pintle 8 after solidification may be larger than the reduction of the inner diameter of the hollow space in the pull tab bearing 7, that is, the diameter of the pintle 8 after solidification may become smaller than the inner diameter of the hollow space in the pull tab bearing 7, and thereby the pull tab 2 and the slider body 1 including the bearings 7, 7 can be molded by one effort in a swingably associated state.

As the method of making a thermal contraction coefficient of synthetic resin different in magnitude, different kinds of synthetic resn could be employed for molding the slider body and the pull tab, respectively. However, it is favorable to mix glass fibers to the synthetic resin for molding the slider body to reduce its thermal contraction coefficient and to use the mixture for molding the pull tab. Showing a few practical examples, favorable synthetic resins are named in the following list. However, the synthetic resins to be used for the slider body and for the pull tab are not always limited to the same kind of resin, any kinds of synthetic resins could be employed in combination for molding.

| Materials for a slider body and thermal contraction coefficients | |
|---|---|
| PBT mixed with glass fibers | 0.1 ~ 1.0% |
| POM mixed with glass fibers | 0.4 ~ 0.6% |
| PA mixed with glass fibers | 0.4 ~ 0.6% |
| Materials for a pull tab and | |

| their thermal contraction coefficients | |
| --- | --- |
| PA (Nylon 66) | about 2.0% |
| POM (Acetal) | about 2.0 ~ 3.0% |
| PBT | about 1.0 ~ 2.0% |

As will be apparent from the detailed description above, according to the present invention, owing to the fact that by making use of only one slide core, a slider body mold cavity is blocked from a pull tab mold cavity and at the same time hollow space portions in the bearings for the pull tab provided within the slider body mold cavity are molded by means of the slide core, after molten synthetic resin has been injected into the slider body mold cavity, the slide core is retreated to connect the pull tab mold cavity with the slider body mold cavity, and then molten synthetic resin having a larger thermal contraction coefficient than that used for molding the slider body is injected into the pull tab mold cavity to mold the pull tab, a structure of a mold can be simplified, hence the mold can be manufactured at a high precision, and accordingly, the products molded by this precise mold can reduce protrusion of burrs to minimum and thus can be produced at a high precision. Moreover, as a result of simplification of the production process, an advantage that a production efficiency is improved, can be obtained.

While a principle of the present invention has been described above in connection to one preferred embodiment of the invention, it is intended that all matter contained in the specification and illustrated in the accompanying drawings shall be interpreted to be illustrative and not in a limiting sense.

What is claimed is:

1. A method of making a slider for use in a slide fastener, which slider consists of a slider body having a pair of bearings for a pull tab on the opposite sides of its upper surface and a pull tab having a pintle at its base end pivotably supported between said respective bearings for the pull tab; comprising:

(A) a first preparatory step, in which a mold provided with a slider body mold cavity and a pull tab mold cavity in continuation with pull tab bearing mold portions of said slider body mold cavity is employed, a slide core is inserted into said pull tab bearing mold portions to block the slider body mold cavity from the pull tab mold cavity by means of said slide core and also to form hollow space portions in the pull tab-bearings;

(B) a first injection molding step, in which an amount of molten synthetic resin is injected into the blocked slider body mold cavity and is left for a solidifying period, thereby forming said slider body with said pair of pull tab bearings;

(C) a second preparatory step, in which said slide core is retreated to make the pull tab mold cavity communicate with the already injection-molded slider body via a pull tab pintle mold portion between the respective pull tab bearings; and (D) a second injection-molding step, in which an amount of molten synthetic resin having a larger thermal contraction coefficient than the synthetic resin injected into the slider body mold cavity, is injected into the pull tab mold cavity and pull tab pintle mold portion, and is left for a solidifying period thereby forming said pull tab and pintle, said pintle becoming smaller in diameter than said pull tab bearings due to said larger thermal contraction such that said slider body and pull tab are swingably associated.

* * * * *